United States Patent
Kusubayashi

(10) Patent No.: US 7,724,546 B2
(45) Date of Patent: May 25, 2010

(54) CONVERTER

(75) Inventor: Chiyo Kusubayashi, Tokyo (JP)

(73) Assignee: Mitsubishi Electric Corporation, Chiyoda-Ku, Tokyo (JP)

(*) Notice: Subject to any disclaimer, the term of this patent is extended or adjusted under 35 U.S.C. 154(b) by 222 days.

(21) Appl. No.: 11/886,295

(22) PCT Filed: Mar. 15, 2005

(86) PCT No.: PCT/JP2005/004507
§ 371 (c)(1),
(2), (4) Date: Sep. 14, 2007

(87) PCT Pub. No.: WO2006/098000
PCT Pub. Date: Sep. 21, 2006

(65) Prior Publication Data
US 2008/0192513 A1    Aug. 14, 2008

(51) Int. Cl.
*H02M 3/335* (2006.01)
(52) U.S. Cl. .................................. 363/21.01
(58) Field of Classification Search ............. 363/21.01, 363/84
See application file for complete search history.

(56) References Cited

U.S. PATENT DOCUMENTS

| 5,028,926 A | 7/1991 | Tokuhiro |
| 5,297,015 A * | 3/1994 | Miyazaki et al. ............ 363/146 |
| 2003/0151929 A1 * | 8/2003 | Figueroa .................. 363/21.01 |

FOREIGN PATENT DOCUMENTS

| JP | 10-304658 A | 11/1998 |
| JP | 2003-47245 A | 2/2003 |
| JP | 2004-260889 A | 9/2004 |
| KR | 92-0010218 | 11/1992 |

OTHER PUBLICATIONS

Machine translation of JP2004260889, Haruyuki, Power Circuit, Sep. 16, 2004, all pages.*
Machine translation of JP 10304658, Masuo et al, Switching Power Supply, Nov. 13, 1998, all pages.*
Korean Office Action in corresponding application No. 10-2007-7017892 dated Feb. 9, 2009, and an English Translation thereof.
PCT/ISA/210 for PCT/JP2005/04507 dated May 24, 2005.

* cited by examiner

Primary Examiner—Bao Q Vu
Assistant Examiner—Jue Zhang
(74) Attorney, Agent, or Firm—Buchanan Ingersoll & Rooney PC

(57) ABSTRACT

A converter capable of suppressing an instant voltage variation and outputting a desired DC power with high precision. The converter includes a power conversion unit that conducts power conversion on a supplied power, a smoothing filter that smoothes the power that has been converted in power, a voltage detector that detects a voltage of the smoothed power, and control unit that outputs a pulse signal for controlling a conduction ratio of a switching element within the power conversion unit so that an output voltage from the voltage detector becomes a desired voltage value. The control unit temporarily stops the power supply when the output voltage increases up to a first given voltage and restarts the power supply when the output voltage decreases down to a second given voltage.

6 Claims, 3 Drawing Sheets

CONVERTER

TECHNICAL FIELD

The present invention relates to a converter, in particular, a DC/DC converter or an AC/DC converter capable of preventing an instant voltage variation of an output voltage and supplying a desired DC voltage to an output side by stopping and restarting a power conversion.

BACKGROUND ART

In a system structure of a conventional electric vehicle DC/DC converter, an output voltage reference that is generated from a microcomputer is compared with an output voltage detection value and a conduction ratio of a switching element is controlled such that an output voltage coincides with the voltage reference (for example, refer to Non-patent Document 1).

According to domestic output voltage specifications disclosed in Non-patent Document 1, a variation range of ±10% is allowed. In general, a voltage variation range of only about ±1% is allowed according to overseas specifications, which requires a high precision as compared with the case of the domestic specifications. Therefore, in order to realize a high-precision converter device that satisfies the overseas specification, a countermeasure is required to be taken against an instant voltage variation, for example, by increasing a switching frequency to speed up a control response, by increasing the capacitance of a smoothing capacitor, or by adding an over-voltage prevention hardware.

Non-patent Document 1: Eiji Sawano and other 6 persons, "High frequency link system DC/DC converter device using IGBT", Institute of Electrical Engineers of Japan of 1995, National convention, lecture collected papers, 1995

DISCLOSURE OF THE INVENTION

Problems to be Solved by the Invention

In the conventional method, in order to cope with an instant voltage variation, the switching frequency is increased to speed up the control response, the capacitance of the smoothing capacitor is increased to reduce an influence of the voltage variation, or an over-voltage prevention hardware is added. As a result, the conventional method must meet a high-precision specification, which leads to such problems that the device is upsized and the costs are increased.

The present invention has been made to solve the above problems, and therefore has an object to provide a converter which is capable of suppressing an instant voltage variation and outputting a desired DC power with a high precision without increasing the switching frequency as well as without increasing the capacitance of the smoothing capacitor, upsizing the device due to the addition of the over-voltage prevention hardware.

Means for Solving the Problems

The present invention provides a converter, including: power converting means for converting a supplied power by a switching element; a smoothing filter for smoothing the power that is converted in power by the power converting means; voltage detecting means for detecting a voltage of the power that is outputted from the smoothing filter; and control means for outputting a pulse signal for controlling a conduction ratio of the supply power in the switching element so that the output voltage that is detected by the voltage detecting means becomes a desired voltage value, in which the control means stops the power supply when the output voltage increases up to a first given voltage which is set in advance so that the output voltage does not become an over-current that exceeds the desired voltage value by a given first allowable range.

EFFECT OF THE INVENTION

With the above configuration according to the present invention, since a power supply can be temporarily stopped by control means so that the output voltage does not become an over-voltage too much higher than a desired voltage value, it is advantageous in that the instant voltage variation can be suppressed by the operation of the control means, and a desired DC power with a high precision can be supplied by the operation of the control means, and a desired DC power can be supplied with a high precision, without increasing the control response due to an increase in the switching frequency as well as without increasing the capacitance of the smoothing capacitor and upsizing the device due to addition of the over-voltage prevention hardware.

BEST MODE FOR CARRYING OUT THE INVENTION

First Embodiment

Figure 1:
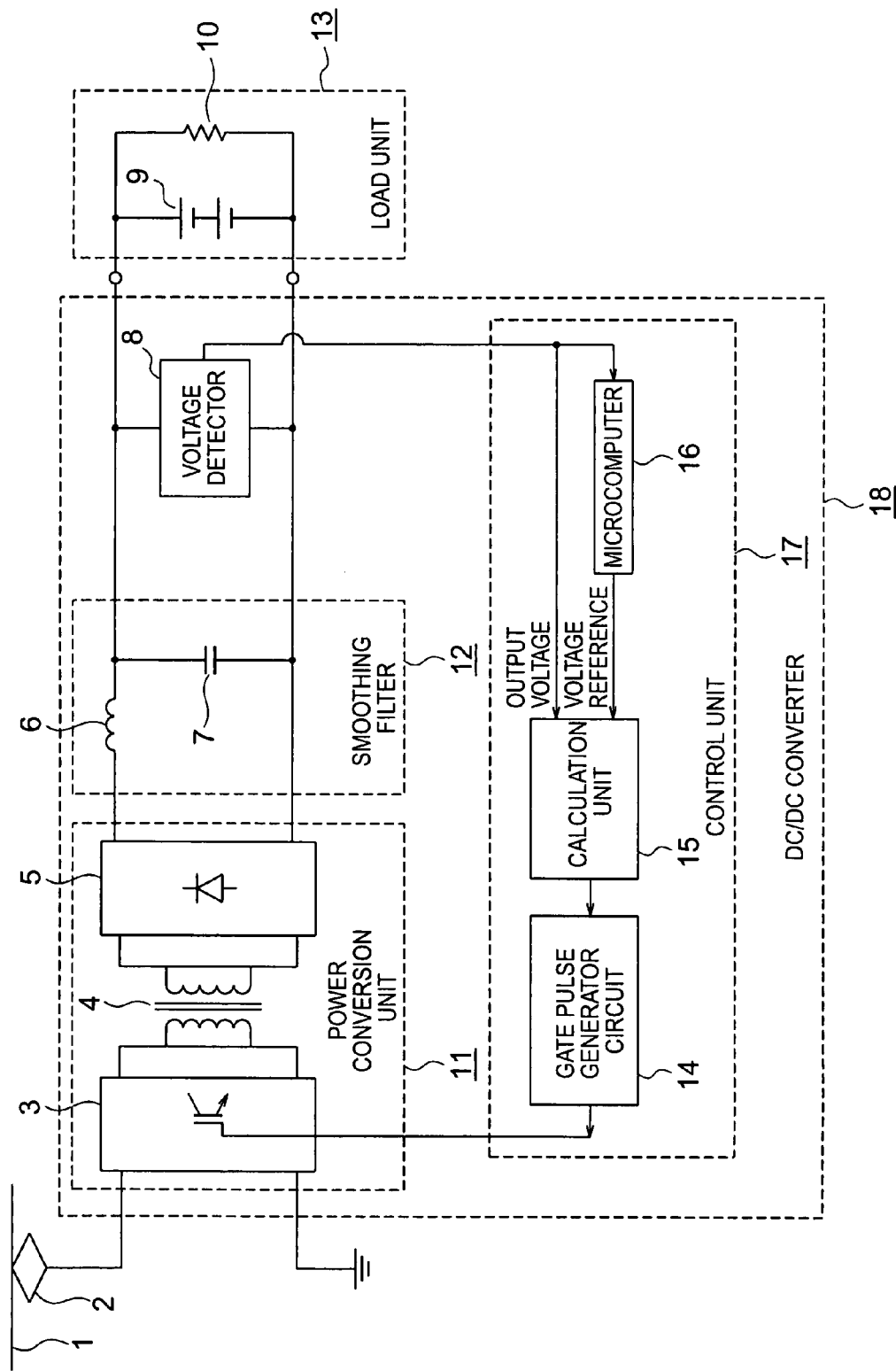
FIG. 1 is a structural diagram showing a configuration of a DC/DC converter for an electric vehicle according to a first embodiment of the present invention.
Figure 2:
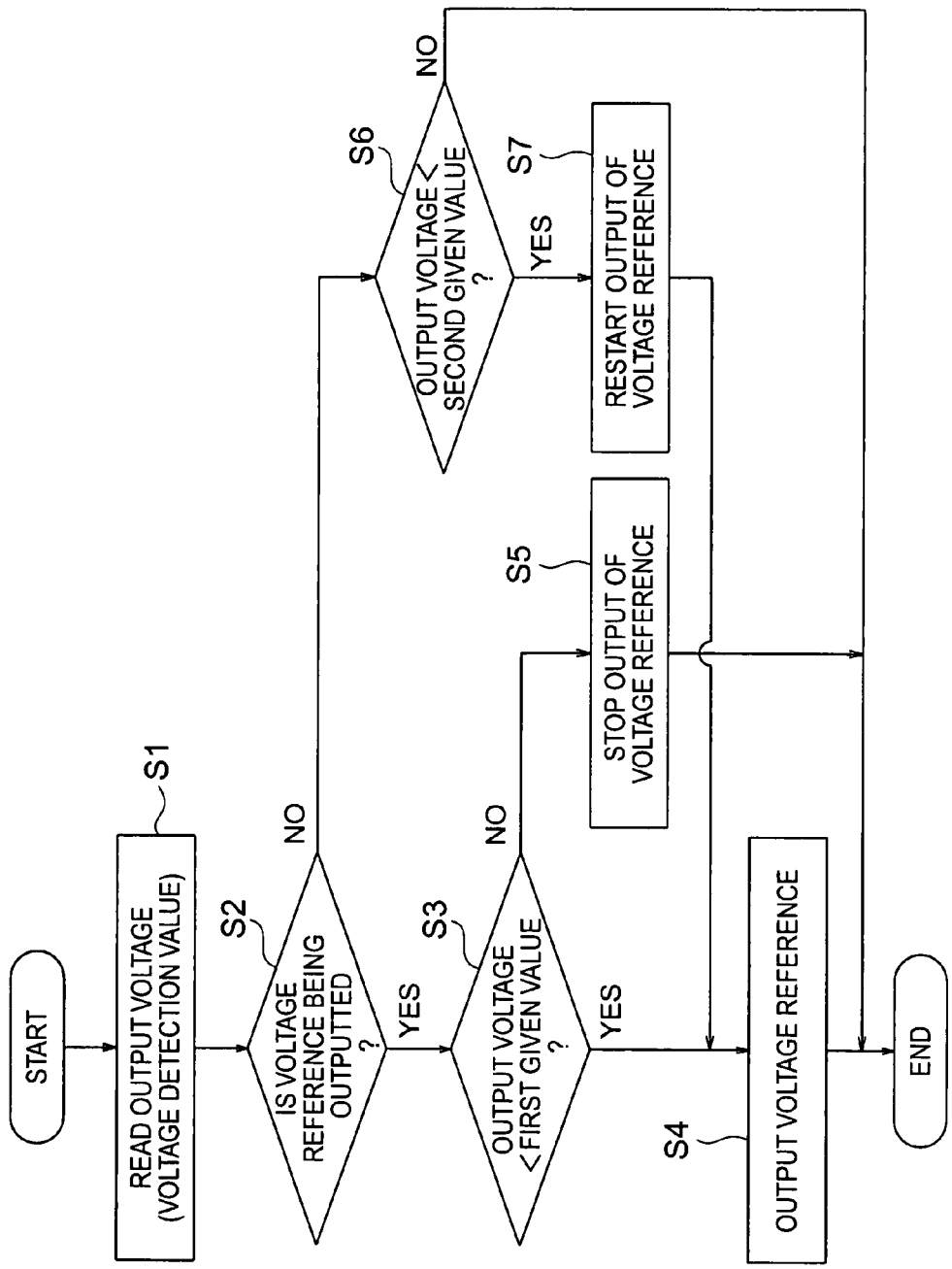
FIG. 2 is a flowchart showing the operation of a microcomputer that is disposed in a converter according to the first embodiment and a second embodiment of the present invention.

FIG. 1 is a diagram showing a configuration of a converter according to a first embodiment of the present invention. In an example of FIG. 1, a converter according to the present invention is applied to an electric vehicle DC/DC converter, and FIG. 2 is a flowchart showing an operation of a microcomputer that is disposed in the converter.

Referring to FIG. 1, a DC/DC converter 18 is made up of a voltage detector 8, a power conversion unit 11, a smoothing filter 12, and a control unit 17. The DC/DC converter 18 subjects a DC power that is obtained from a wire 1 through a pantograph 2 to DC/DC conversion, and supplies a DC power to a load unit 13 that is made up of a battery load 9 and an electric load 10.

The power conversion unit 11 is made up of an inverter 3, a transformer 4, and a rectifier 5. The switching element of the inverter 3 is formed of, for example, an IGBT, and controlled based on a gate pulse from the control unit 17, takes in the DC power that is given from the wire 1 through the pantograph 2, and subjects the DC power to DC/AC conversion. The transformer 4 subjects the AC power that has been converted by the inverter 3 to AC/AC conversion. The rectifier 5 subjects the AC power that has been converted by the transformer 4 to AC/DC conversion.

A smoothing filter 12 is made up of a smoothing reactor 6 and a smoothing capacitor 7, and smoothes the DC power having a large number of ripples which has been converted by the power conversion unit 11.

The voltage detector 8 detects an output voltage, and transmits a voltage detection value to a calculation unit 15 and a microcomputer 16 in the control unit 17. The operation unit 15 may be made up of an analog circuit or the like, or may be made up of software.

The control unit 17 is made up of a gate pulse generator circuit 14, the calculation unit 15, and the microcomputer 16. The microcomputer 16 outputs a voltage reference such that the output voltage becomes a desired voltage. The calculation unit 15 compares the voltage detection value with the voltage reference, and calculates the conduction ratio of a supply power in a switching element for conducting power conversion such that those two values coincide with each other. The gate pulse generator circuit 14 generates a gate pulse corresponding to the conduction ratio.

The operation of the microcomputer 16 will be described in more detail with reference to the flowchart shown in FIG. 2. First, in Step S1, the microcomputer 16 reads a value of the output voltage (voltage detection value) that is outputted from the voltage detector 8. Then, in Step S2, the microcomputer 16 determines a continuation/stop state of the output operation of the voltage reference.

In the case where it is determined that the output operation of the voltage reference is continuing in Step S2, when the output voltage from the voltage detector 8 is lower than a first given value which is predetermined in Step S3, the microcomputer 16 continuously outputs a voltage reference in Step S4.

On the contrary, even in the case it is determined that the output operation of the voltage reference is continuing in Step S2, but when an output voltage from the voltage detector 8 is determined as being equal to or higher than the above first given value in Step 3, the microcomputer 16 stops the output operation of the voltage reference to stop the power supply in Step S5. In other words, the power supply is temporarily stopped when the output voltage has increased up to the first given voltage, in order to prevent the output voltage from the voltage detector 8 from becoming over-voltage too much higher than the desired voltage value (that is, to prevent the output voltage from becoming over-voltage that exceeds a given allowable range).

Also, in the case where it is determined in Step S2 that the output operation of the voltage reference is stopped, when the output voltage from the voltage detector 8 is determined as being equal to or higher than a predetermined second given value in Step S6, the processing is ended as it is, and the output operation of the voltage reference remains stopped.

On the contrary, even in the case where it is determined that the output operation of the voltage reference is stopped in Step S2, but when the output voltage from the voltage detector 8 is lower than the above second given value in Step S6, the microcomputer 16 restarts the output operation of the voltage reference in Step S7, and outputs the voltage reference in Step S4. In other words, the power supply is restarted when the output voltage decreases to the second given voltage, in order to prevent the output voltage from becoming too much lower than the desired voltage value during when the generation of the voltage reference is stopped (that is, to prevent the output voltage from becoming low voltage that exceeds a given allowable range).

The relationship of the first given value and the second given value satisfies a relationship of the second given value < the first given value. Also, the first given value and the second given value each fall within a variation range that is permissible from the given voltage value, and therefore appropriately set within a range of ±10% in the domestic specification, and appropriately set within a range of ±1% in the overseas specification.

According to the present invention, in the case where no voltage reference is outputted, that is, in the case where the voltage reference is 0 V, when the calculation unit 15 compares the output voltage from the voltage detector 8 with the voltage reference (that should be a value that allows a desired voltage to be naturally outputted), the calculation unit 15 determines that the output voltage remarkably exceeds the desired voltage value. As a result, the microcomputer 16 conducts the control so as to rapidly narrow the supply power, and instructs the inverter 3 to subject the low voltage to the power conversion. However, in the case where the voltage that has been converted in power according to the commands of the calculation unit 15 is lower than the actual output voltage, power supply from the power conversion unit 11 to the smoothing filter 12 and to the load unit 13 is not conducted, and power supply stops.

As described above, in the present invention, since the power supply can temporarily stop, it is advantageous in that the function of suppressing the instant voltage variation is achieved, and the desired DC power can be supplied with a high precision. Also, in the present invention, since the control of the power supply can be realized by the operation of the microcomputer, this embodiment has the advantages that it is not necessary to increase the switching frequency so as to speed up the control response, to upsize the hardware, or to additionally provide the over-voltage prevention hardware which leads to an increase in cost.

In addition, since the microcomputer 16 is capable of restarting the output of the voltage reference, it is possible to easily restart the power supply. Therefore, it is advantageous in that the output voltage is prevented from becoming too low, and the desired DC power can be supplied with a high precision to the output side.

Second Embodiment

Figure 3:
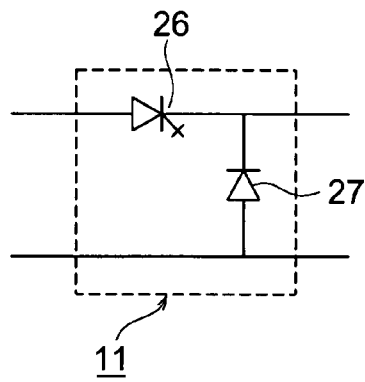
FIG. 3 is a structural diagram showing the configuration of a DC/DC power conversion unit according to the second embodiment of the present invention.

FIG. 3 shows a diagram of another structure of the power conversion unit 11 shown in the above first embodiment. The power conversion unit 11 in this embodiment is not structured by the inverter 3, the transformer 4, and the rectifier 5 in FIG. 1, but is structured by a chopper that is made up of a switching element GTO 26 and a diode 27 as shown in FIG. 3. Even in the power conversion unit 11 in this embodiment, the DC/DC conversion which is the same as that in the first embodiment can be performed, and the operation of the microcomputer 16 produces the same control effects as those in FIG. 2 with respect to the power conversion unit 11 according to this embodiment shown in FIG. 3.

Third Embodiment

Figure 4:
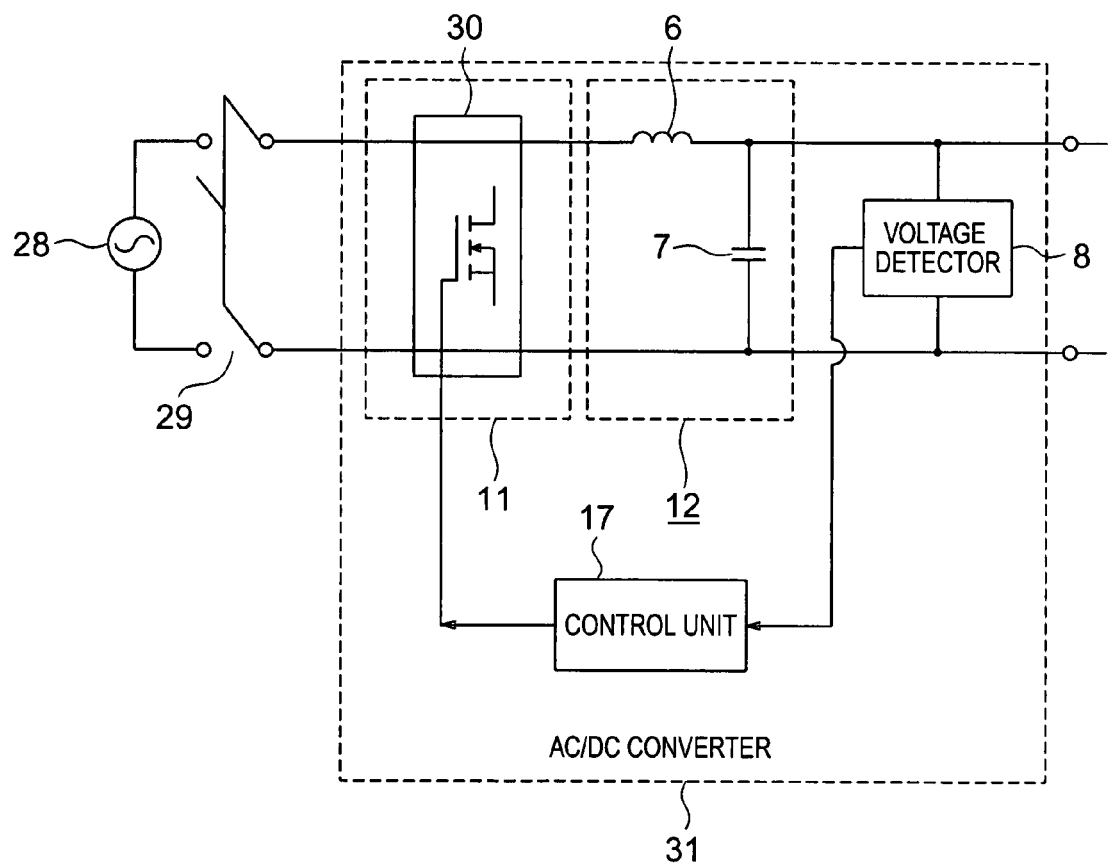
FIG. 4 is a structural diagram showing the configuration of an AC/DC converter according to a third embodiment of the present invention.

FIG. 4 is a diagram showing the configuration of a converter according to a third embodiment of the present invention. An example of FIG. 3 applies the converter of the present invention to the AC/DC converter. Since a flowchart for showing the operation of the microcomputer disposed in the converter is identical with that shown in FIG. 2, FIG. 2 should be referred to. An AC/DC converter 31 is made up of a voltage detector 8, a power conversion unit 11, a smoothing filter 12, and a control unit 17, and takes in an AC power from an AC voltage source 28 through a switch 29, converts AD/DC conversion on the AC power, and outputs a desired DC power.

The power conversion unit 11 is made up of only a rectifier 30 using a switching element MOSFET. Controlled by the control unit 17, the switching element takes in an AC power from the AC voltage source 28 and conducts AC/DC conversion on the AC power. Because the construction and operation of the smoothing filter 12, the voltage detector 8, and the control unit 17 are identical with those in the first embodiment, FIG. 1 should be referred to, and their description will be omitted in this example. The operation of the microcomputer 16 (refer to FIG. 1) which is disposed within the control unit 17 produces the same control effects as those in the first embodiment with respect to the voltage conversion unit 11 shown in FIG. 4.

As described above, in this embodiment, since the power supply can be temporarily stopped as in the first embodiment, it is advantageous in that the function of suppressing the instant voltage variation is achieved, and the desired DC power can be supplied with a high precision. Also, in the present invention, since the control of the power supply can be realized by the operation of the microcomputer, this embodiment has the advantages that it is not necessary to increase the switching frequency so as to speed up the control response, to upsize the hardware, or to additionally provide the overvoltage prevention hardware which leads to an increase in cost.

In addition, since the microcomputer 16 is capable of restarting the output of the voltage reference, it is possible to easily restart the power supply. Therefore, it is advantageous in that the output voltage is prevented from becoming too low, and the desired DC power can be supplied with a high precision to the output side.

Fourth Embodiment

In the above first and second embodiments, a description was given of the control of the DC/DC converter for electric vehicle, but the DC/DC converter may also be applied to a battery charger, and in this case, there is obtained the same control effects as those in the above first and second embodiments. In the case of the DC/DC converter for the battery charger, the switching element of the power conversion unit 11 shown in FIGS. 1 and 3 may be formed of a MOSFET, a thyristor, and a transistor, to obtain the same effects.

Fifth Embodiment

In the third embodiment, the MOSFET is used as the switching element, but the same control effects are obtained even when the IGBT, the thyristor, or the transistor is used as the switching element.

The invention claimed is:

1. A converter, comprising:
power converting means for converting a supplied power by a switching element;
a smoothing filter for smoothing the power that is converted in power by the power converting means;
voltage detecting means for detecting a voltage of the power that is outputted from the smoothing filter; and
control means for outputting a voltage reference that is compared with the output voltage that is detected by the voltage detecting means, and outputting a pulse signal for controlling a conduction ratio of the supply power in the switching element so that the output voltage coincides with the voltage reference,
wherein the control means stops the output of the voltage reference when the output voltage is larger than a first given voltage that is set in advance, and outputs the pulse signal even while the output of the voltage reference remains stopped.

2. A converter according to claim 1, wherein the control means restarts the output of the voltage reference when the output of the voltage reference is stopped and when the output voltage is smaller than a second given voltage that is smaller than the first given voltage and set in advance.

3. A converter according to claim 1, wherein the power conversion by the power converting means comprises DC/DC conversion.

4. A converter according to claim 1, wherein the power conversion by the power converting means comprises AC/DC conversion.

5. A converter according to claim 2, wherein the power conversion by the power converting means comprises DC/DC conversion.

6. A converter according to claim 2, wherein the power conversion by the power converting means comprises AC/DC conversion.

* * * * *